United States Patent
Harman

[15] 3,662,911
[45] May 16, 1972

[54] TOWING DEVICE
[72] Inventor: Donald A. Harman, 41614 - 102nd Street, East Lancaster, Calif. 93534
[22] Filed: Mar. 20, 1970
[21] Appl. No.: 21,288

[52] U.S. Cl. ................................................................214/334
[51] Int. Cl. ...........................................................B60p 3/06
[58] Field of Search.................214/330, 331, 332, 333, 334, 214/506

[56] References Cited

UNITED STATES PATENTS

| 3,049,253 | 8/1962 | Cabral | 214/332 |
| 2,215,529 | 9/1940 | Nazarko | 214/506 |
| 3,361,277 | 1/1968 | Johnson et al. | 214/334 |
| 2,980,270 | 4/1961 | Elliott et al. | 214/334 |
| 1,537,156 | 5/1925 | Baxter | 214/506 |
| 3,154,324 | 10/1964 | Symes | 214/506 |
| 1,882,656 | 10/1932 | Creedon | 214/16.12 B |

Primary Examiner—Robert G. Sheridan
Assistant Examiner—Lawrence J. Oresky
Attorney—A. Donald Stolzy

[57] ABSTRACT

A land vehicle to tow the nose wheel of an aircraft having a tricycle landing gear. The vehicle is a powered two-wheeled vehicle. The wheels are parallel. A hand-carried tongue extends in one direction from the wheel axis. A scoop extends in the opposite direction. The scoop is motor driven by the wheels. Loading is accomplished by driving the scoop underneath the aircraft wheel. An adjustable towline is used for balance during towing.

3 Claims, 6 Drawing Figures

Patented May 16, 1972
3,662,911
2 Sheets-Sheet 1
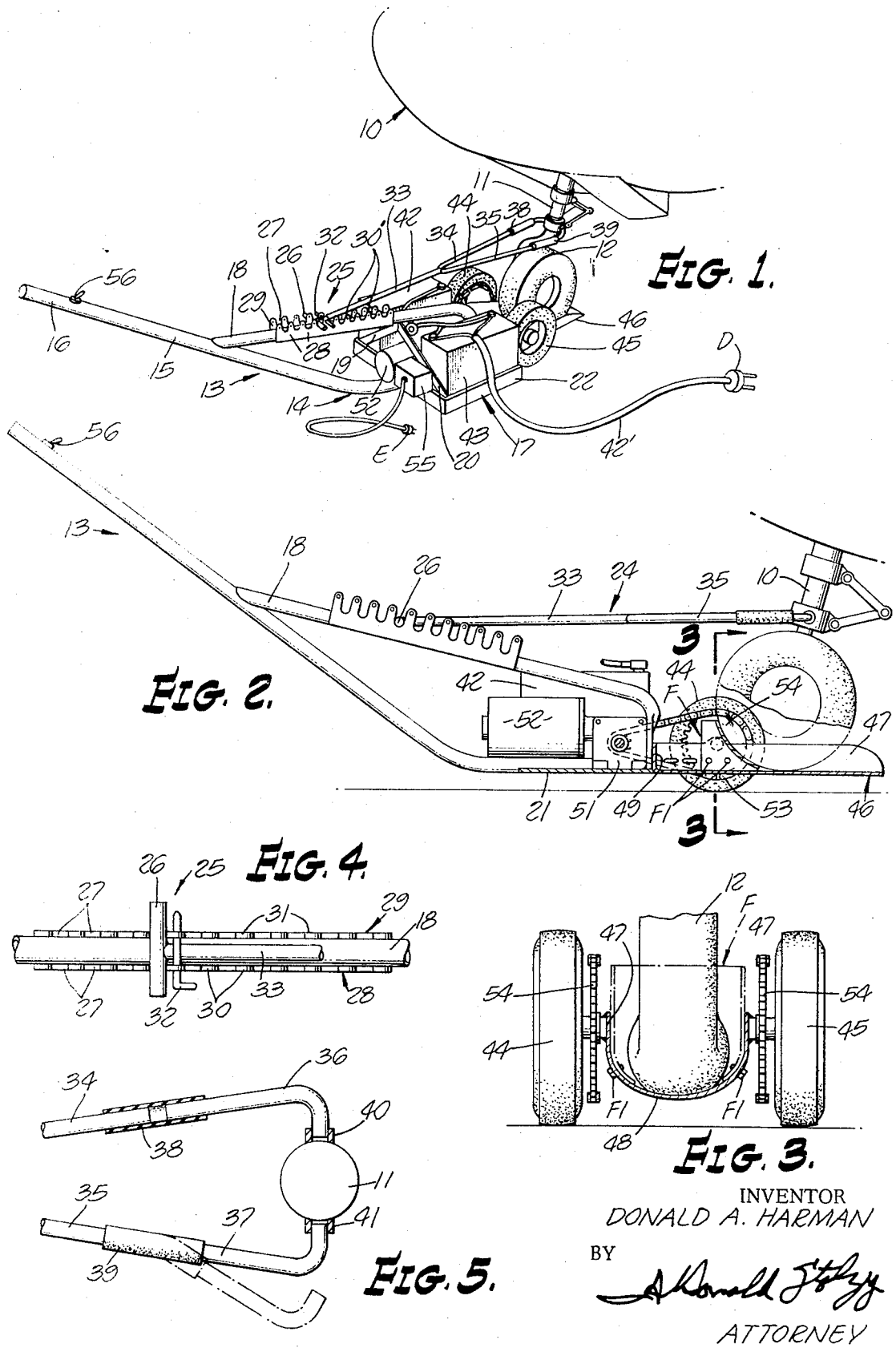
INVENTOR
DONALD A. HARMAN
BY
A. Donald Stolzy
ATTORNEY

INVENTOR
DONALD A. HARMAN
BY
ATTORNEY

TOWING DEVICE

BACKGROUND OF THE INVENTION

This invention relates to land vehicles, and more particularly to a two-wheeled device for moving aircraft or the like over the ground.

Notwithstanding the foregoing, the device of the present invention is not limited to the towing of aircraft.

In the past, tractors have been used to move small and medium size aircraft from place to place about an airport. It is conventional to hook up such a tractor with the nose wheel. However, the entire nose wheel is usually loaded onto the tractor. A complicated loading mechanism is then used. Further, the tractor has had a relatively heavy frame and three or more wheels. The large size of the tractor has also been a disadvantage because the tractor has thereby been difficult to operate. The cost of such a tractor has also been large due to its size and complexity.

SUMMARY OF THE INVENTION

In accordance with the device of the present invention, the above-described and other disadvantages of the prior art are overcome by providing a two-wheeled land vehicle powered to tow an aircraft.

The vehicle has a frame including a tongue at one end for the operator to hold, and a scoop at the other end to hold the nose wheel of an aircraft. The vehicle is powered by batteries and an electric motor. The scoop is driven underneath the nose wheel for loading. A towline is used for towing. The equipment is balanced for easy handling. Loading is quick and easy. The size and cost of the vehicle are also relatively small.

The above-described and other advantages of the present invention will be better understood from the following description when considered in connection with the accompanying drawings.

BRIEF DESCRIPTION OF THE DRAWINGS

In the drawings, which are to be regarded as merely illustrative:

FIG. 1 is a perspective view of the towing device of the present invention;

FIG. 2 is a side elevational view thereof, partly in section;

FIG. 3 is a transverse sectional view thereof taken on the line 3—3 shown in FIG. 2;

FIG. 4 is a top plan view of a portion of the towing device;

FIG. 5 is a top plan view, partly in section of means connecting the towing device to a vehicle to be towed.

DESCRIPTION OF THE PREFERRED EMBODIMENT

Figure 6:
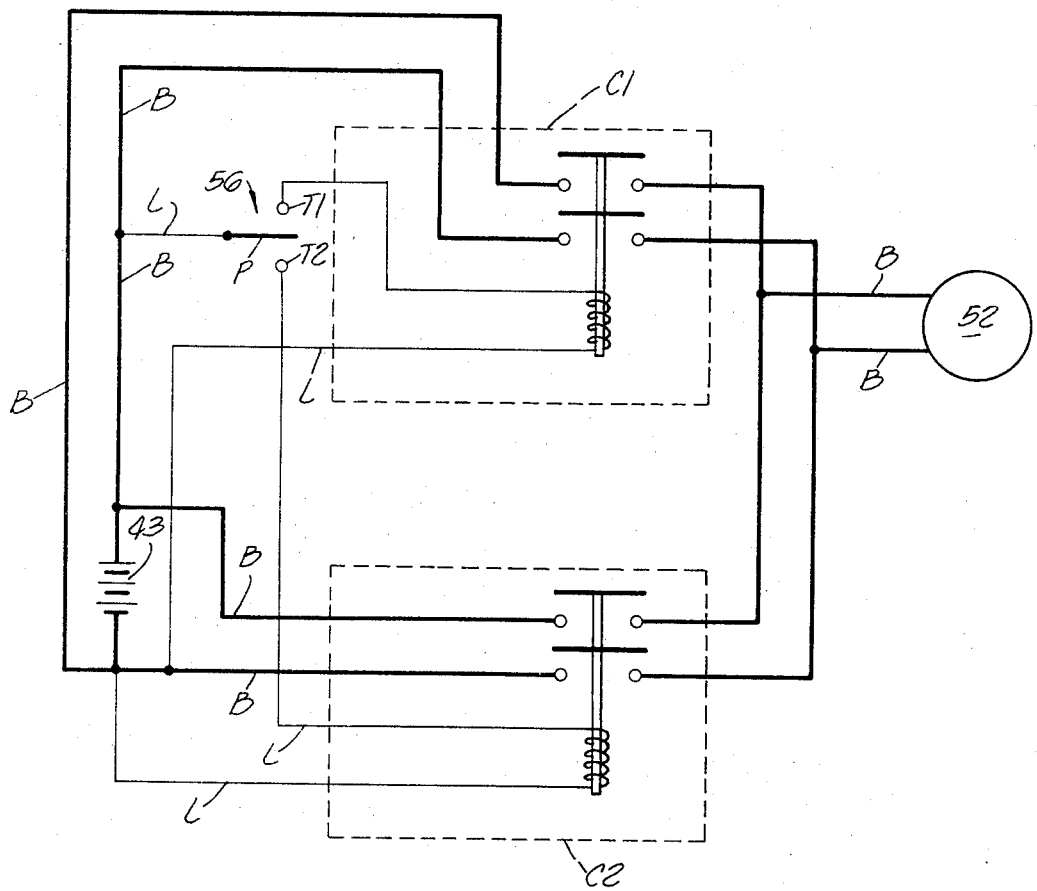
FIG. 6 is a schematic diagram of the circuit of the invention.

In the drawings, in FIG. 1, an aircraft to be towed is indicated at 10 having the conventional retractible shaft 11 and nose wheel 12 suspended therefrom. Nose wheel 12 is one part of a tricycle landing gear, some of which is not shown.

The towing device of the present invention is indicated at 13, including a frame 14. Frame 14 includes a tongue 15 having a handle 16, and a rectangular carrier 17. Carrier 17 is fixed to tongue 15 by braces 18, 19 and 20. Brace 18 has one end fixed to tongue 15 and its other end fixed to a bottom wall 21 of carrier 17. Carrier 17 not only has bottom wall 21, but also two sidewalls 22 and one end wall 23. Braces 19 and 20 are fixed between one end wall 23 and brace 18.

A connecting device 24 has a T-shaped end portion 25. The cross 26 of the T fits in slots 27 in two plates 28 and 29 fixed to brace 18. Plates 28 and 29 have projections 30 and 31, respectively, defining slots 27. Projections 28 and 29 have holes 30' therethrough through which a pin 32 can be slidably inserted. Device 24 has a part 33 which forms the shank of the T. Pin 32 passes over and holds down shank 33 and holds cross 26 in plate slots 27 as best shown in FIGS. 1 and 4.

Device 24 has two legs 34 and 35 fixed to shank 33. Device 24 has connecting parts 36 and 37 connected to legs 34 and 35, respectively, by flexible, cylindrical tubes 38 and 39 connected, respectively, therebetween as best shown in FIGS. 1 and 5. Parts 36 and 37 have a uniform circular cross section throughout their lengths.

As shown in FIG. 5, shaft 11 has two rigid, hollow cylinders 40 and 41 fixed thereto. The ends of parts 36 and 37 are slidable snugly inside cylinders 40 and 41, respectively. Parts 36 and 37 thus form releasable connecting means with the aircraft for towing.

Device 24 is a tow bar furnished by various aircraft manufacturers, and hooks to the nose wheel in many different ways. However, it always has a T-handle.

Carrier 17 carries two 12-volt batteries 42 and 43 which are connected in parallel. If desired, batteries 42 and 43 may be used alone. Alternatively, they may be omitted, and device 13 driven through a conventional lead D1 and an electrical connector for connection with the aircraft battery or the aircraft ground power supply, if the aircraft battery is too low to crank the aircraft.

Device 13 is supported on wheels 44 and 45 suspended rotatably from an approximately rectangular scoop 46 shown in FIG. 2. Scoop 46 is symmetrical about a longitudinal vertical plane through its center. Scoop 46 has two identical sidewalls 47, a bottom wall 48 and a rear wall 49 as shown in FIGS. 2 and 3. Each sidewall 47 has an ear 50. Wheels 44 and 45 may be rotatably suspended from ears 50 in any conventional manner.

A stop F for nose wheel 12 is fixed to the bottom wall 48 of scoop 46. Stop F keeps nose wheel 12 from rolling too far toward rear wall 49, by accident. Bottom wall 48 has four slots through which cap screws F1 extend. Screws have heads larger than the slots. Screws F1 are threaded into stop F. The longitudinal position of stop F in scoop 46 is therefore adjustable.

A gear reducer 51 is driven by an electric motor 52. Gear reducer 51 has a pair of output sprockets to drive wheels 44 and 45 through a pair of chains 53 and a pair of sprockets 54 fixed to wheels 44 and 45, respectively. Gear reducer 51 and motor 52 are fixed to bottom wall 21 of carrier 17.

Electric current is supplied to motor 52 by two relays or contactors, not shown in FIG. 1. A trickle charger 55 keeps the batteries up. A single pole double-throw, three-position switch 56 is fixed to handle 16 to turn motor 52 off or on and forward, or on and in reverse. Preferably contactors are used so that heavy battery cable need not be employed in connecting switch 56 into the circuit.

As shown in FIG. 6, battery supplies electrical power to motor 52 through switch 56 and contactors C1 and C2. Contactors C1 and C2 may be energized alternately, but not at the same time. By being a three-position switch, switch 56 may stay in an off position as shown. In this position, pole P does not touch either contact T1 or T2. When it touches T1, contactor C1 is energized. When it touches T2, contactor C2 is energized. The output of the contactors are connected in parallel to motor 52. When energized, one contactor places the battery across the motor with one polarity. When the other contactor is energized, it places the battery across the motor with the opposite polarity.

Contactors C1 and C2 may be entirely conventional single or double pole, single-throw switches, electromagnetically operated. They may be identical to conventional relays except for their size. Extra leads may be provided from the contactors to battery 43 so that motor current does not have to pass through switch 43. Battery cable is indicated at B. Switch leads are indicated at L.

OPERATION

In the operation of the towing device 13, before device 24 is connected to device 12 or aircraft 10, the open end 57 of scoop 46 is lightly wedged between nose wheel 12 and the ground. Switch 56 is then operated to cause motor 52 to drive scoop underneath nose wheel 12. Little or no pressure need be manually applied downwardly on handle 16 for loading. Device 24 is then attached to aircraft 10 and to device 13. The several slots 27 provide an adjustable feature so that the unbalanced weight of device 13 to the left of the axis of wheels 44 and 45 shown in FIG. 2 may be fairly precisely counterbalanced by locating the nose wheel 12 along the length of scoop 46 at an appropriate position. The counterbalancing thus makes for easy handling during towing to the left.

In accordance with the foregoing, powered loading makes handling easy as well as counterbalancing.

What is claimed is:

1. A land vehicle for towing a wheel of another device, said vehicle comprising: a pair of wheels rotatable over the ground about a common axis; a frame fixed relative to said wheels except by being rotatable about said axis, said frame having a tongue extending perpendicularly from said axis on one side thereof, said frame having a scoop extending perpendicularly from said axis on the other side thereof, said scoop being oriented perpendicular to said axis with the bottom thereof closest to the ground, the open end thereof farthest from said axis and sidewalls extending upwardly, said tongue and said scoop forming an angle such that an erect man may comfortably guide said tongue when said pair of wheels are driven and said scoop is raised to a position out of contact with the ground; retainer means fixed relative to said frame to prevent the wheel of said device from rolling in a direction toward the open end of said scoop; and power means to rotate said pair of wheels relative to said frame, said retainer means including a member having one end for connection with said other device and adjustable means to connect the other end of said member at a plurality of different positions on said frame on said one side of said wheel axis, said other end of said member being T-shaped, said tongue having a plurality of slots defined between pairs of projections, each projection having a hole therethrough and a bar slidable through a pair of holes closer to said wheel axis than where the T is located to keep the T in a pair of slots.

2. The invention as defined in claim 1, said tongue having a handle, a single pole double-throw switch fixed to said handle, said switch having an off position, said power means including an electric motor, a gear reducer fixed to said frame and connected from said motor to said pair of wheels, a pair of contractors, a battery, said switch being adapted to operate said contractors selectively, said battery supplying power to said contractors and to said motor through said contractors, said contractors being adapted to cause said motor to drive said pair of wheels in forward and reverse, respectively, said switch having a position to disconnect power to said motor and to prevent substantially any rotation of said wheels, said gear reducer having a gearing ratio sufficiently high to prevent movement of said wheels except by skidding when a horizontal force is applied to said frame.

3. The invention as defined in claim 2, wherein a stop is positioned in said scoop to limit movement of said other device wheel toward said axis, and attachment means to fix said stop relative to said scoop, said attachment means being adjustable to allow said stop to be fixed in position at different locations relative to said scoop.

* * * * *